US012546608B2

(12) United States Patent
Filimonov et al.

(10) Patent No.: US 12,546,608 B2
(45) Date of Patent: Feb. 10, 2026

(54) VISION-BASED LOCATION AND TURN MARKER PREDICTION (71) Applicant: Harman International Industries, Incorporated, Stamford, CT (US)

(72) Inventors: Andrey Viktorovich Filimonov, Bogorodskiyrayon (RU); Ohad Akiva, Hod-Hasharon (IL); Timothy Raymond VanGoethem, Milford, MI (US)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 135 days.

(21) Appl. No.: 18/040,130

(22) PCT Filed: Jul. 31, 2020

(86) PCT No.: PCT/RU2020/000400
§ 371 (c)(1),
(2) Date: Jan. 31, 2023

(87) PCT Pub. No.: WO2022/025786
PCT Pub. Date: Feb. 3, 2022

(65) Prior Publication Data
US 2023/0273029 A1  Aug. 31, 2023

(51) Int. Cl.
*G01C 21/30* (2006.01)
*G06T 7/73* (2017.01)
(52) U.S. Cl.
CPC .............. *G01C 21/30* (2013.01); *G06T 7/74* (2017.01); *G06T 2207/20081* (2013.01); *G06T 2207/20084* (2013.01); *G06T 2207/30252* (2013.01)
(58) Field of Classification Search
CPC .................... G01C 21/30; G06T 7/74
See application file for complete search history.

(56) References Cited

U.S. PATENT DOCUMENTS

2018/0164812 A1  6/2018  Oh et al.
2019/0114507 A1  4/2019  Chiu et al.
(Continued)

FOREIGN PATENT DOCUMENTS

CN  109815300 A  5/2019
CN  111275000 A  6/2020
(Continued)

OTHER PUBLICATIONS

ISA European Patent Office, International Search Report and Written Opinion Issued in Application No. PCT/ RU2020/000400, Apr. 29, 2021, WIPO, 111 pages.

*Primary Examiner* — Imran K Mustafa
(74) *Attorney, Agent, or Firm* — McCoy Russell LLP (57) ABSTRACT A computer-implemented method and apparatus for accurately determining a vehicle's position and predicting navigation key points in real time. The method including instructing a vehicle mounted camera to capture a plurality of images, computing the angular changes between a first image and a subsequent second image, determining the vehicle's position and heading vector from the computed angular changes, collecting at least one image of the plurality of images as a first training subset, obtaining image-related coordinates of navigation key points as a second training subset related to the at least one image of the first training data subset, supplying the first and second training data subset to an artificial neural network as a training dataset, and training the artificial neural network on the training dataset to predict image-related coordinates of navigation key points indicative of road sign locations and/or turn points.

18 Claims, 10 Drawing Sheets (56) References Cited

U.S. PATENT DOCUMENTS

| | | | | |
|---|---|---|---|---|
| 2020/0175718 A1* | 6/2020 | Viswanathan | ....... | G06V 20/584 |
| 2020/0380274 A1* | 12/2020 | Shin | .......... | G06T 1/20 |
| 2022/0011130 A1* | 1/2022 | Hanniel | ............ | G01C 21/3647 |
| 2022/0282967 A1* | 9/2022 | Putz | ....... | G01S 17/86 |

FOREIGN PATENT DOCUMENTS

| | | |
|---|---|---|
| WO | 2019023628 A1 | 1/2019 |
| WO | 2020048623 A1 | 3/2020 |
| WO | 2020139356 A1 | 7/2020 |

* cited by examiner

VISION-BASED LOCATION AND TURN MARKER PREDICTION

CROSS-REFERENCE TO RELATED APPLICATIONS

The present application is a U.S. National Phase of International Application No. PCT/RU2020/000400, entitled "VISION-BASED LOCATION AND TURN MARKER PREDICTION", and filed on Jul. 31, 2020. The entire contents of the above-listed application are hereby incorporated by reference for all purposes.

The present disclosure relates to a computer-implemented method and an apparatus for determining a vehicle's position and predicting turn points and lane changes.

BACKGROUND OF THE INVENTION

Global Navigation Satellite Systems (GNSS) are frequently used in navigation systems of vehicles to determine the vehicle's location. Typically this is achieved by receiving signals from at least three satellites at the vehicle's navigation system and calculating the vehicle's location with the received signals by trilateration. Generally, it is possible to accurately determine the vehicle's location from the received signals. However, this relies on a non-obstructed path between the navigation system and the satellites. Therefore, when the vehicle is in a tunnel/urban canyon, or during bad weather the navigation system can struggle to receive accurate signals from the satellites, thereby impairing its ability to accurately determine the vehicle's location. To address this issue, present navigation systems comprise dead reckoning processes which calculate the vehicle's position by using a previously determined position (by the GNSS) and estimating the present position based on an estimation of the vehicle's speed and course over elapsed time since the previous determined position.

With a conventional GNSS arrangement, it can prove to be difficult to identify the precise direction of travel of the vehicle and the orientation, especially when the vehicle is stationary (for example at a red traffic light). To address this issue, present navigation systems are fitted with an Internal Measurement Unit (IMU) which measures and reports the vehicle's specific force, angular rate, and orientation using a combination of accelerometers, gyroscopes, and sometimes magnetometers.

Therefore, present navigation systems can measure both the location of a vehicle using GNSS trilateration and its orientation and direction of travel using the IMU. Furthermore, present navigation systems can estimate the vehicle's location when the navigation system struggles to receive accurate signals from the satellites.

Although accurate enough for basic navigation, present navigation systems still struggle to accurately determine the vehicle's position, direction of travel, and orientation in real time. For example, the GNSS' update rate ranges from 0.1 to 1.0 Hz which results in a slight delay in determining the position of the vehicle. Furthermore, IMUs are fast, with a refresh rate in the kHz range, but tend to be noisy and drift. Further still, dead reckoning processes also tend to be noisy and experience drift, especially during longer periods of signal outages. Therefore, present navigation systems are not accurate enough for navigation systems with Augmented Reality capacities. Accordingly, there exists a need to accurately determine a vehicle's position, direction of travel, and orientation in real time to implement Augmented Reality capacities (such as identifying road signs, intersections and lane changes) into present navigation systems.

SUMMARY

To overcome the issues detailed above, the inventors have devised novel and inventive vehicle position apparatus and techniques.

More specifically, claim 1 provides a computer-implemented method for determining a vehicle's position and predicting navigation key points. Logic circuitry within the vehicle's navigation system can instruct a vehicle mounted camera, coupled to the logic, to capture a plurality of images and transmit those images back to the logic circuitry. The logic circuitry can receive the plurality of images, wherein the plurality of images comprise at least a first image captured at a first time interval and a second image capture at a second time interval. Upon receiving at least the first and the second images, the logic circuitry can analyze the images and compute the angular changes between the first image and the second image. With the computed angular changes, the logic circuitry can accurately determine the vehicle's position and heading vector in real time.

The computer-implemented method may additionally receive GPS coordinates from a Global Navigation Satellite System (GNSS) module coupled to the logic, measurements from an Inertial Measurement Unit (IMU) coupled to the logic, and the vehicle's velocity, to determine a confidence value for the determined vehicle's position and heading vector, based on the received GPS coordinates, IMU measurements, and vehicle's velocity. For example, if the logic determines that the position and heading vector determined from the images of the vehicle mounted camera are completely different to the GPS, IMU and velocity measurements, the logic can instruct the vehicle mounted camera to capture a second plurality of images with a higher frequency such that the time interval between the captured images of the second plurality images is shorter than the time interval between the captured images of the first plurality of images. The logic can then restart the process of computing the angular changes between two images of the second plurality of images, and determine the vehicle's position and heading vector in real time based on the computed angular changes.

In an embodiment, the method can collect at least one image of any one of the plurality of images (as a first training data subset), obtain image-related coordinates of navigation key points (as a second training data subset) related to the at least one image of the first training data subset, and supply the first training data subset and the second training data subset to an artificial neural network as a training dataset. The method may then train the artificial neural network on the training dataset to predict image-related coordinates of navigation key points indicative of road sign locations and/or turn points, and process the input dataset by the artificial neural network to predict image-related coordinates of navigation key points indicative of road sign locations and/or turn points. This allows for the depth information and the upcoming turn points/intersections/lane changes to be translated such that they can be displayed on the screen of the navigation system, or a heads-up-display (HUD) to indicate to the user that a turn point/intersection/lane change is coming up.

In some examples, a second vehicle mounted camera can be coupled to the logic and the computer-implemented method may be operable to instruct the second vehicle mounted camera to capture a further plurality of images and transmit those to the logic to more accurately determine the vehicle's position and heading vector in real time. In some examples, the first and/or the second vehicle mounted cameras can be forward-facing cameras (FFC) placed to capture images of the view directly in front of the vehicle.

The present disclosure further relates to an apparatus as set out in claim 14 for determining a vehicle's position and predicting navigation key points, wherein the apparatus comprises means for performing the method of the present disclosure. For example, the apparatus comprises a logic and a first vehicle mounted camera (FFC), wherein the logic may be employed to instruct the vehicle mounted camera (FFC) to capture a plurality of images, and the logic may compute the angular changes between a first image and a second image of the plurality of images to determine the vehicle's position and heading vector in real time. Furthermore, the logic may be operable to collect, as a first training data subset, at least one image of the first plurality of images, obtain, as a second training data subset, image-related coordinates of navigation key points related to the at least one image of the first training data subset, supply the first training data subset and the second training data subset to an artificial neural network as a training dataset. train the artificial neural network on the training dataset to predict image-related coordinates of navigation key points indicative of road sign locations and/or turn points, and process the input dataset by the artificial neural network to predict image-related coordinates of navigation key points indicative of road sign locations and/or turn points.

BRIEF DESCRIPTION OF THE DRAWINGS

Embodiments are described by way of example, with reference to the accompanying drawings, which are not drawn to scale, in which like reference numerals refer to similar elements.

DETAILED DESCRIPTION OF THE PREFERRED EMBODIMENTS

Figure 1:
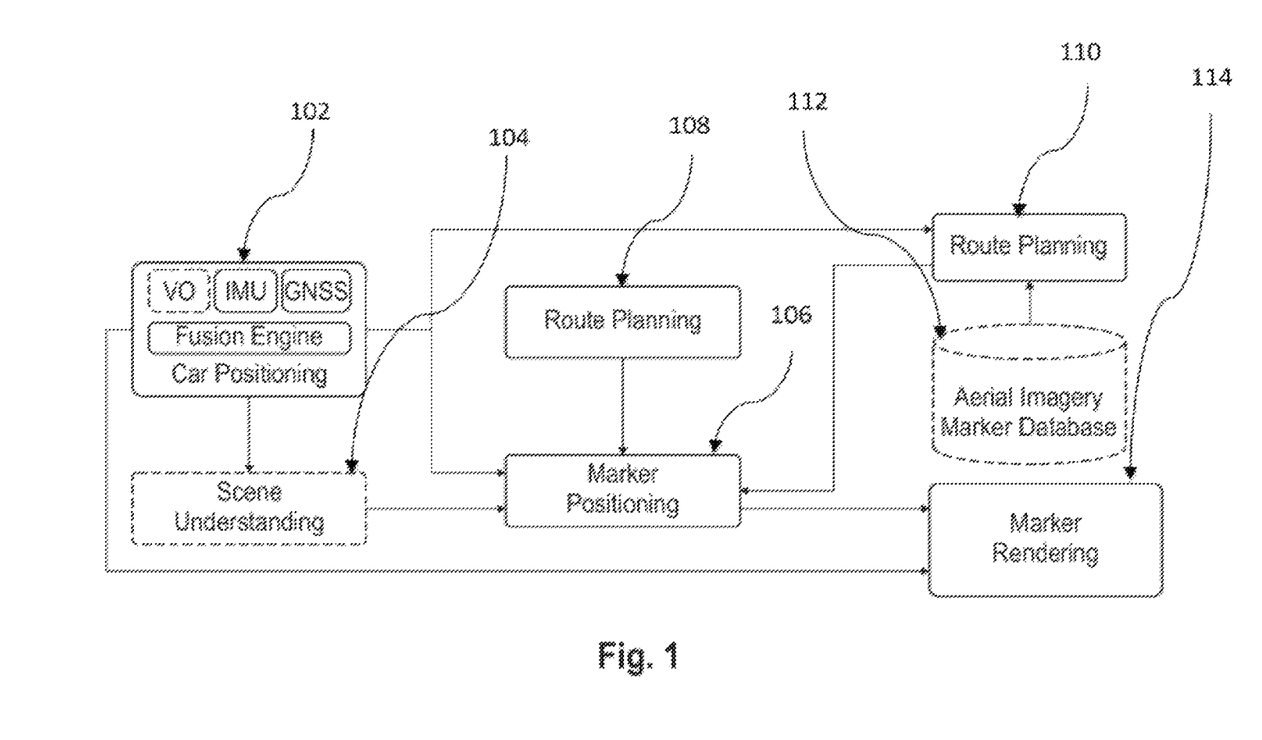
FIG. 1 illustrates an overall system architecture for vision-based location with augmented reality capability.

FIG. 1 shows an exemplary overall system architecture for vision-based location with augmented reality capabilities. The system architecture may be part of a vehicle's on-board navigation system, wherein the navigation system can predict navigation key points indicative of road sign locations and/or turn points. Some examples of turn points include, but are not limited to, lane changes and intersections. The navigation system can be implemented in any type of road-going vehicle, such as a car, lorry, bus, etc.

The system may comprise a Car Positioning Block 102, which may calculate the position of the vehicle based on canonical Global Navigation Satellite System (GNSS) and/or Inertial Measurement Unit (IMU) sensors. The Car Positioning Block 102 may additionally derive the vehicle's position and heading vector from Visual Odometry (VO). VO is a real-time computer vision algorithm that computes the angular changes between one forward-facing camera (FFC) frame to the next frame. When this is added to other signals coming from the GNSS subsystem, IMU and vehicle speed, the vehicle's position and heading vector can be determined with a greater accuracy. The Car Positioning Block 102 will be described in more detail in FIG. 2.

The position and heading vector can then be used by the Aerial Imagery Marker Database 112, an offline database, to obtain suitable marker positions that have been extracted offline by an artificial neural network, wherein marker positions are equivalent to navigation key points indicative of road sign locations and/or turn points. The Aerial Imagery Marker Database 112 may be built by scanning satellite and/or aerial images of the earth's surface. That Database 112 may further comprise a marker selector (not shown) which uses current car's location and route information to select markers (for example road sign locations and/or turn points) related to the vehicle's current route. The building of the offline Aerial Imagery Marker Database 112 will be discussed in more detail in FIGS. 3 to 5.

The position and heading vector can additionally be used by the Scene Understanding 104 block to better determine marker locations within an FFC frame. Scene Understanding 104 is a neural network that can run in real-time to place a marker (for example road sign locations and/or turn points) relative to the scene coming from the vehicle's forward-facing camera (FFC) or similar camera using semantical image analysis. Scene Understanding 104 may scan FFC frames and use scene analysis and other sources of information (for example standard-definition maps) to determine screen coordinates of the marker locations as well as depth information and/or ground plane estimation of the marker locations. Scene Understanding 104 will be discussed in more detail in FIGS. 6 to 9.

Scene Understanding 104 and the offline extracted marker positions from the Aerial Imagery Marker Database 112 can be used separate or together to calculate the actual marker position relying on different marker position sources and predictions. Therefore, the system architecture (i.e. the vehicle's navigation system) can accurately predict an upcoming road sign and/or turn point using any one of the predicted marker positions of the Aerial Imagery Marker Database 112, the vehicle's FFC frames from Scene Understanding 104, or a combination of the two.

The Marker Positioning 106 block can use information and normalized confidence scores from the Aerial Imagery Marker Database 112 and Scene Understanding 104 components to determine where to place the marker based on the vehicle's position and heading vector. The Marker Positioning 106 block may implement smoothing techniques to avoid jitter caused by changing which source to use for each marker for a given route. The Marker Rendering Engine 114 may work in synchrony with Scene Understanding 104 and/or the Aerial Imagery Marker Database 112 to translate the marker's geo-coordinates into screen coordinates, such that the markers can be displayed on the vehicle's navigation screen and are visible to the user. Route Planning 108, 110 can then determine the waypoints and maneuvers that the vehicle is expected to follow from the origin to the desired destination.

Figure 2:
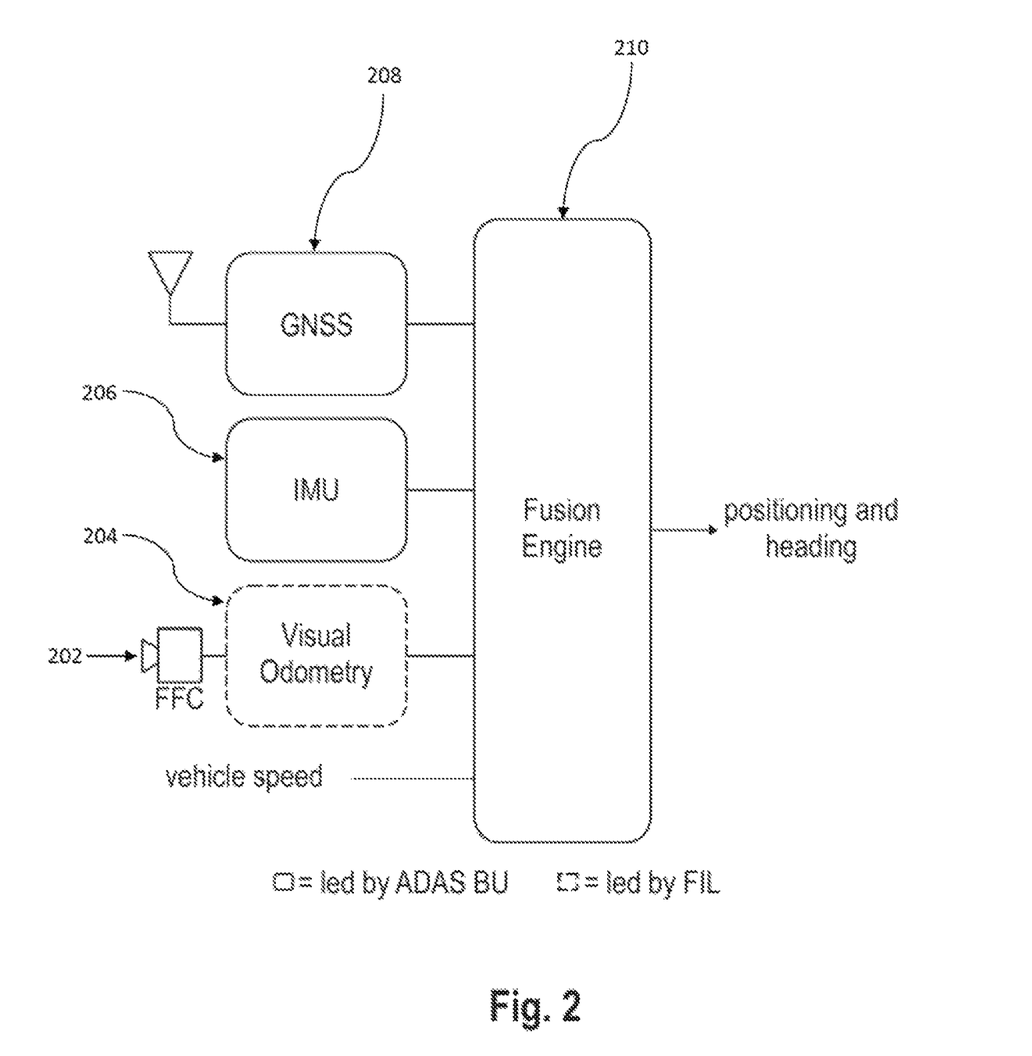
FIG. 2 illustrates an apparatus for determining a vehicle's position.

FIG. 2 shows a more detailed example of the Car Positioning Block 102 of FIG. 1, which may be an apparatus for determining a vehicle's position, such as part of the vehicle's navigation system. The apparatus may comprise a first vehicle mounted camera, such as a forward-facing camera (FFC) 202 which captures a plurality of forward-facing (relative to the vehicle) images. The FFC 202 may be coupled to a Visual Odometry (VO) unit 204 which can instruct the FFC 202 to capture the plurality of forward-facing images, and subsequently receives the first plurality of images from the FFC 202. The plurality of images may be taken sequentially with equidistant time periods between each image. Upon receiving the plurality of images, the VO unit 204 can compute the angular changes between one image and the next image (one frame to the next frame). Subsequently, the VO unit 204 can determine the vehicle's position and heading vector in real-time from the determined angular changes and transmit the vehicle's position and heading vector to the Fusion Engine 210.

The Fusion Engine 210 may receive additional measurements, such as GPS coordinates from a Global Navigation Satellite System (GNSS) module 208, Inertial Measurement Unit (IMU) measurements from an IMU module 206, and the vehicle's velocity. The GNSS module 208, IMU module 206 and VO unit 204 may each be coupled to the Fusion Engine 210 by physical or wireless means such that they can transmit signals to each other. Furthermore, the FFC 202 (and any further camera) may be coupled to the VO unit 204 by physical or wireless means. The vehicle's velocity may be recorded from the vehicle's speedometer or from an external source, such as by calculation from the GNSS module 208. Following receipt of these additional measurements, the Fusion Engine 210 can compare the vehicle's position and heading vector calculated from the images captured by the FFC 202 to the measurements received from the GNSS module 208, IMU module 206 and vehicle speed to determine a confidence value of the calculated vehicle position and heading vector. If the confidence value is determined to be below a pre-determined threshold, the Fusion Engine 210 may instruct the FFC 202 (through the VO unit 204) to increase the frequency at which images are captured, such that the FFC 202 captures a further plurality of sequential images with a reduced time period between each image. As discussed above, the VO unit 204 can receive the further plurality of images taken at an increased frequency, and can compute the angular changes between one image and the next image (one frame to the next frame) to determine an updated version of the vehicle's position and heading vector in real-time, to be transmitted to the Fusion Engine 210. The Fusion Engine 210 may repeat this method if the confidence value is still determined to be below the pre-determined threshold.

By using a mono-vision algorithm, the VO unit 204 can calculate an adequate angle to overcome the drift and noisiness of a typical IMU. Furthermore, a stereo-vision may be implemented comprising the first vehicle mounted camera and a second vehicle mounted camera (for example two FFCs), thus allowing for the VO unit 204 to compute an even more precise angle as well as provide depth information. It should be noted that any number of vehicle mounted cameras or FFCs can be used to provide more accurate results.

Figure 3:
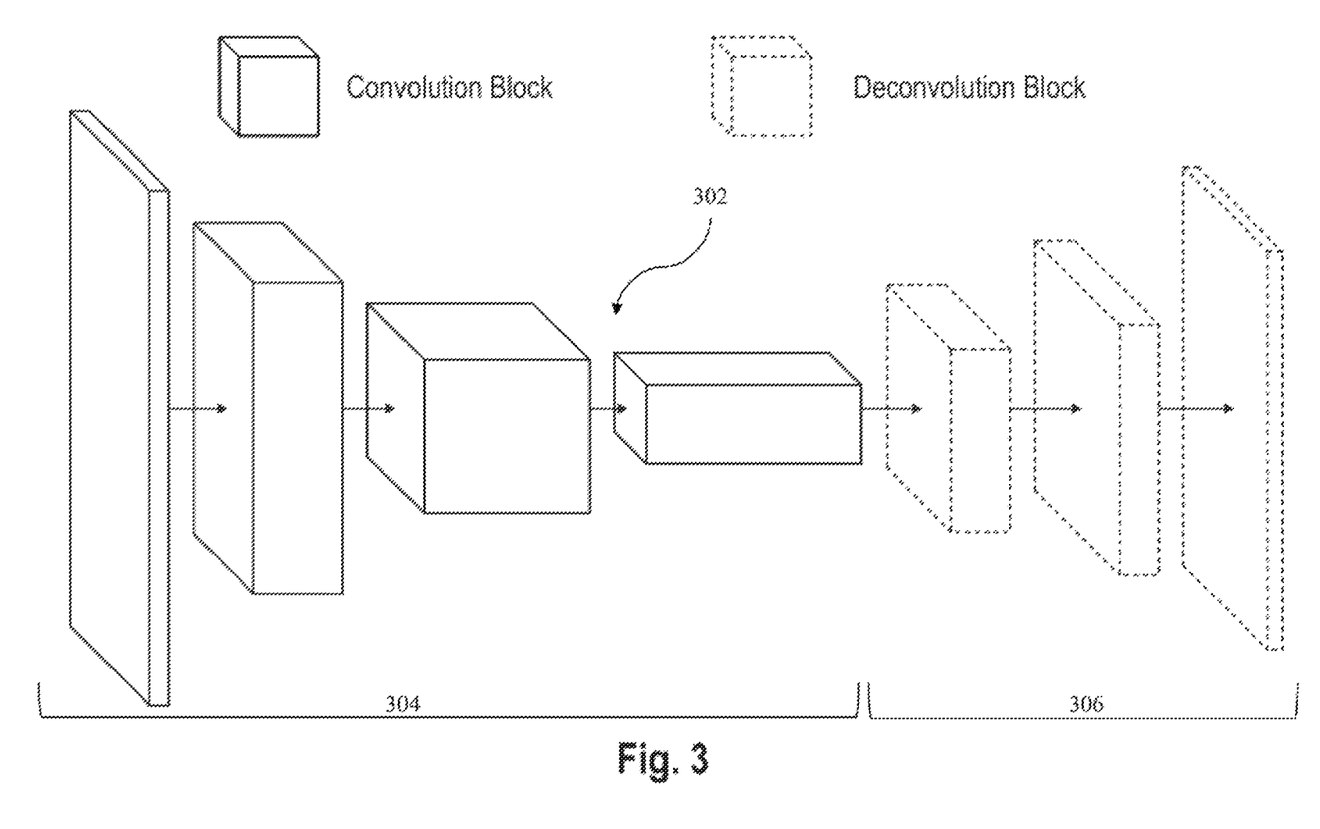
FIG. 3 illustrates an example of a deep neural network employed in the present disclosure.

FIG. 3 shows an example of a deep neural network, a type of artificial neural network, of the present disclosure. The deep neural network may be a convolutional neural network 302 that may be trained and, after training, stored in an apparatus 300 of the present disclosure. The convolutional neural network 302 may comprise a multitude of convolution blocks 304, a multitude of deconvolution blocks 306 and an output layer (not shown). Each block may comprise several layers. During training the training dataset is supplied to the first one of the convolution blocks 304. During inference the input dataset, i.e. the defined region of interest, is supplied to the first one of the convolution blocks 304. The convolution blocks 304 and the deconvolution blocks 306 may be two-dimensional. The deconvolution blocks 306 followed by the output layer may transform the final output data of the convolution blocks 304 into the output dataset (output predictions) that is then output by the output layer. The output dataset includes the predicted key point marker locations, i.e., the predicted virtual road sign locations. The output dataset of the convolutional neural network 302 may be given by a pixel map of possible intersections in the pre-determined region (training phase) or in the defined region of interest (inference phase) with a probability value (probability score) associated with each pixel. Those pixels for which the probability score is high, i.e., exceeds a predefined threshold (for example, 90% (0.9)), are then identified as predicted key point marker locations.

Figure 4:
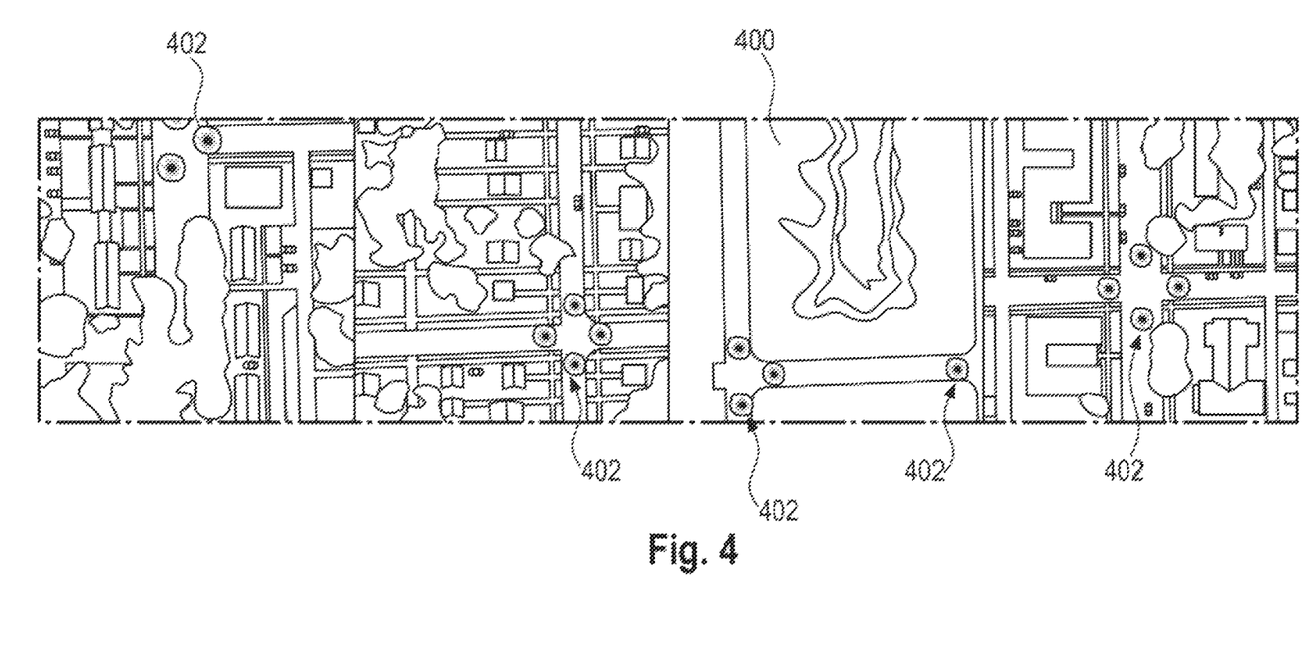
FIG. 4 illustrates an example of predicted key point marker locations indicated in environmental data.

FIG. 4 shows an example of key point marker locations 402 that have been predicted by the deep neural network of the present disclosure in a region of interest 400 which was supplied to the trained deep neural network as input data during inference. As in FIG. 3, right-hand side, the predicted key point marker locations 402 represent turn point marker locations at intersections such as crossroads or T junctions, and may be positioned in the center of a lane or road entering an intersection.

Figure 5:
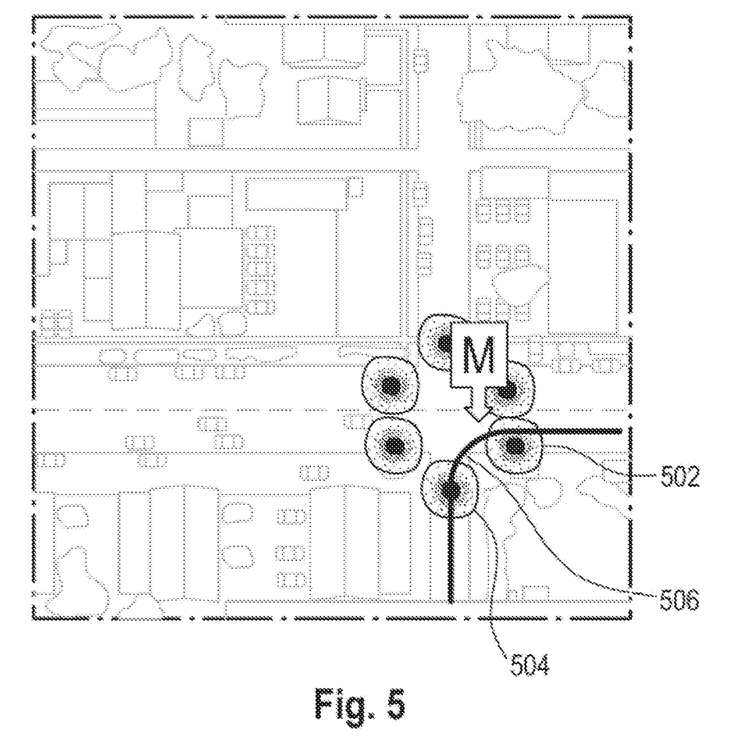
FIG. 5 illustrates a further example of predicted key point marker locations indicated in environmental data.

The key point marker locations may also be predicted such by the trained deep neural network that the key point markers are positioned on a curved path connecting two adjacent potential key point marker locations at road/lane centers. In this case, the key point marker locations (i.e., the visual road sign locations) may be chosen such on the curved path that the key point markers/virtual road signs are more visually appealing/better visible/better discernible to a driver, for example, not occluded by a building but instead placed before the building. An example is shown in FIG. 5 where two adjacent potential key point marker locations 502 and 504 are connected by a curved path 506 on which the key point marker M, i.e, the virtual road sign, is then placed such that it can be better or easily perceived by a driver than if the key point marker were to be placed at locations 502 or 504.

Figure 6:
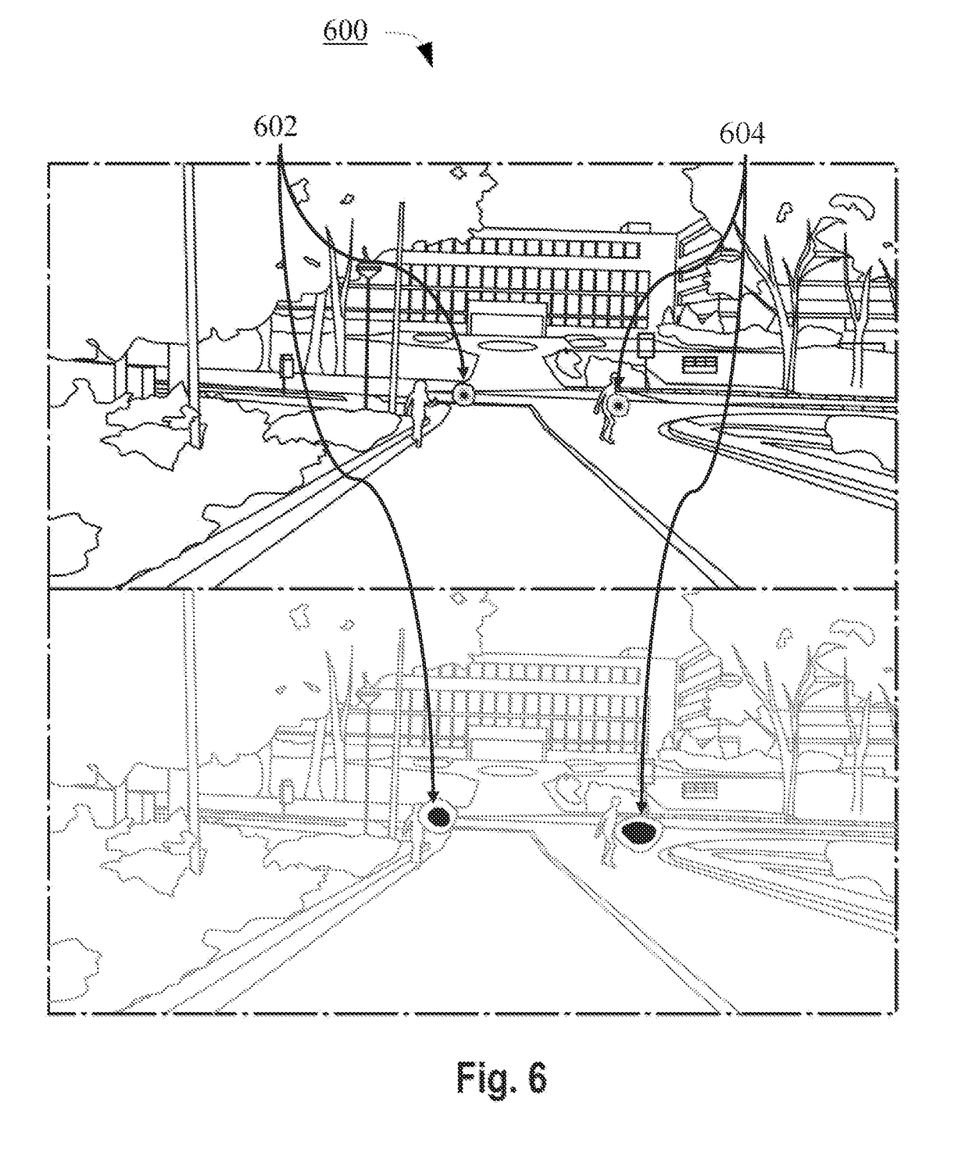
FIG. 6 illustrates an overlay of an example image with an example key marker generated by the artificial neural network.

FIG. 6 shows an example overlay image 600 with an example key marker generated by the artificial neural network. In that example an image may be captured by the FFC 202, when the vehicle is approaching an intersection. The Fusion Engine 210 of FIG. 2 may collect that image (or a plurality of the captured images) as a first training data subset for the artificial neural network, and may further obtain, as a second training data subset, image-related coordinates of the navigation key points/markers related to the image (or the plurality of images) of the first training data subset. Furthermore, the Fusion Engine 210 may supply both first training data subset and second data training subset to the artificial neural network as a training dataset. Accordingly, the Fusion Engine 210 may train the artificial neural network on the training dataset to predict image-related coordinates of navigation key points/markers indicative of road sings and/or turn points, and may process the input dataset by the artificial neural network to predict image-related coordinates of navigation key points/markers indicative of road sign locations and/or turn points.

Overlaid over the image 600 are, at two positions 602, 604, contour plots indicative of regions of high (white with black line around) and very high (filled black) probability that the navigation key point is comprised therein. These contours are determined by a neural network and post-processed so that, e. g., a maximum value, or individual center of mass positions can be determined.

Figure 7:
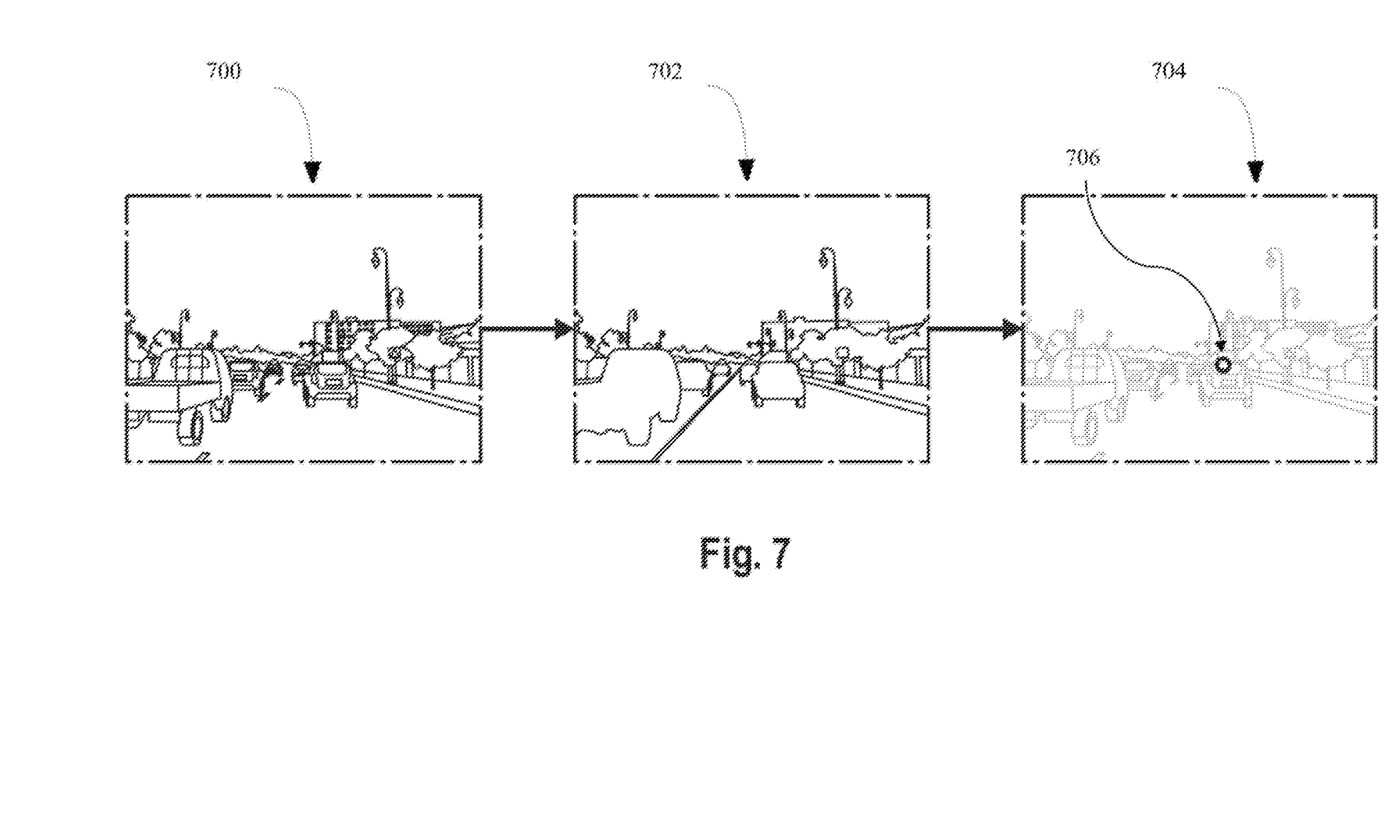
FIG. 7 illustrates a series of images during processing by a convolutional neural network.

FIG. 7 illustrates an example three-step process of processing of the forward facing camera image according to an embodiment of the present disclosure. The image 700 from a forward facing camera serves as an input. The artificial neural network then processes the image using a semantic approach. Different areas of the image, covered by different types of objects, are identified: The street, other vehicles, stationary objects, the sky, and lane/street delimitations. Image 702 illustrates the intermediate (processed) image. Lines correspond to borders between areas related to different types of objects. In the next step, the navigation key point is determined based on this semantic understanding of the image. This approach allows determining the navigation key point even if its location is occluded by other objects. The result is shown in image 704, where the marker 706 indicates the location of the navigation key point.

In some embodiments, the Fusion Engine 210 may determine a confidence value for the image-related coordinates. The confidence value may be determined for the image-related coordinates. The confidence value indicates a probability that the image-related coordinates are the correct coordinates of the navigation key point. Thereby, it can indicate whether the coordinates have been determined correctly.

The first training data subset can comprise one or more images for which the artificial neural network determines a confidence value below a predefined threshold. Therefore, the training of the neural network can be performed more efficiently. The artificial neural network can be a convolutional neural network, as discussed above in FIG. 3. During training, the weights of the convolutional neural network can be set such that the convolutional neural network predicts navigation key point marker locations as close as possible to the locations of the navigation key point markers included in the second training data subset. Meanwhile, the coordinates of second training data subset can be obtained through at least one of user input, one or more crowdsourcing platforms, and providing established geocentric positions of the key points in the pre-determined region.

Optionally, the Fusion Engine 210 may supply the first training data subset to a second artificial neural network as input data to predict, by the second neural network, image-related coordinates of navigation key points based on the first training data subset. Accordingly, a second confidence value can be determined indicative of the distances between the navigation key point locations predicted by the trained artificial neural network and the second artificial neural network. Therefore, the effect of the training can be monitored, and parameters, including the threshold for the confidence value, may be adapted.

The image-related coordinates may indicate the position of navigation key points on an image. They may be expressed as pixel row and column numbers. Processing may comprise the generation of a heat map depicting values of the probability that a point on the image is the navigation key point. Processing may further comprise additional image processing steps known in the art. The navigation key points may be used to correctly display instructions to a driver. This may be achieved by superimposing instructions, street names, and other output over a camera image or a similar depiction of the surroundings of the mobile device.

In an embodiment, the method further comprises translating the image-related coordinates into geocentric coordinates as described with regard to the Marker Rendering Engine 114. This is possible since the navigation key points relate to stationary objects, such as road signs, intersection corners, and lanes. This may be done in a two-step process: First, the image-related coordinates are translated, by a projection, into coordinates relative to the device, expressed, for example, as distance and polar angle with respect to a predefined axis fixed to the device. In a second step, the position of the device is determined and the coordinates are transformed into geocentric coordinates, e. g. as longitude and latitude. The geocentric coordinates may then be used by the same mobile device or by other devices to identify key point locations. Thereby, other mobile devices that are not configured to execute the method of the present disclosure may use the data. Furthermore, the data are usable in case camera data are unavailable due to bad weather, a camera malfunction, or other conditions.

Figure 8:
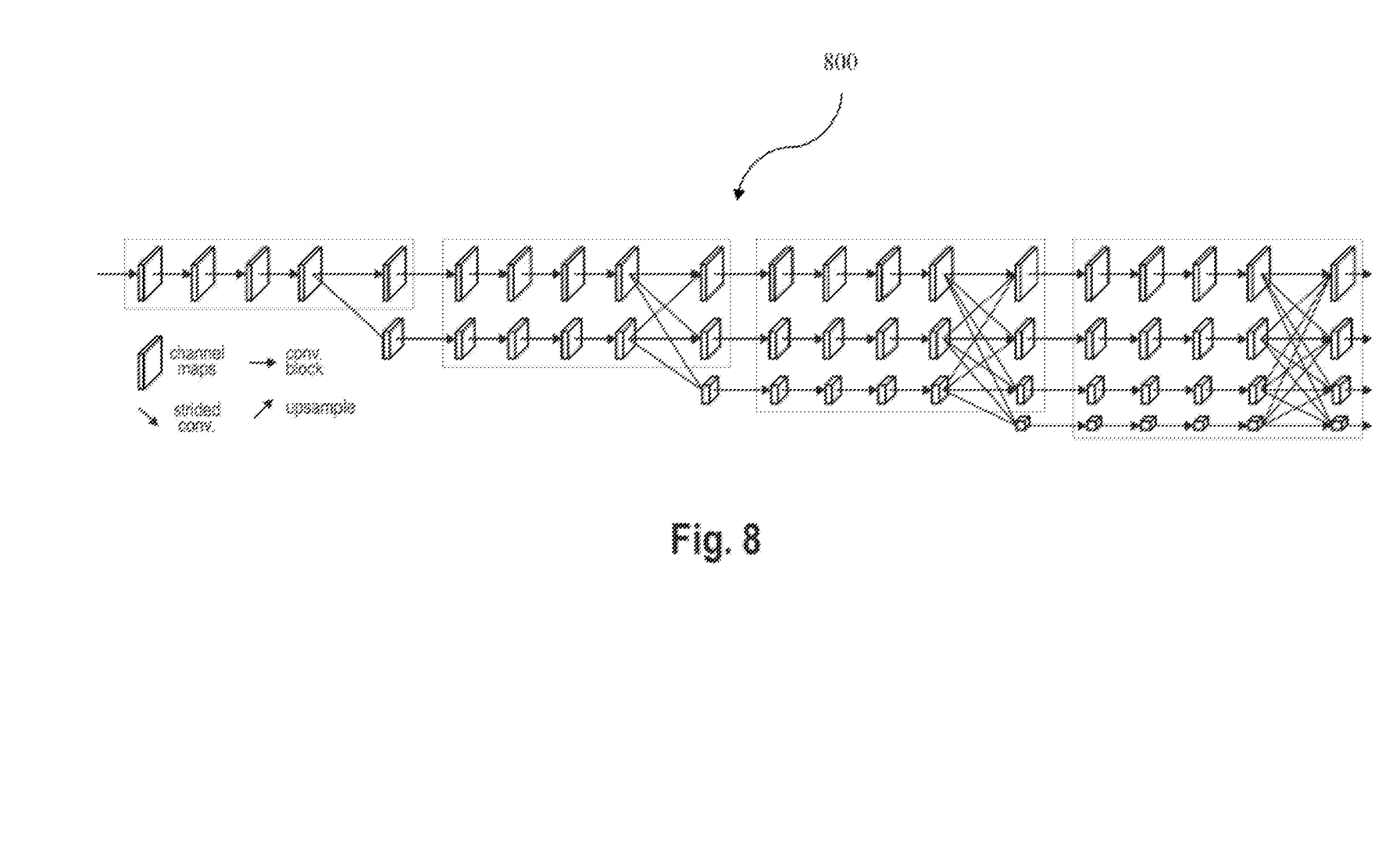
FIG. 8 illustrates artificial neural network with HRNet architectural features.

In an embodiment, the artificial neural network and/or deep neural network as described above may exploit HRNet architectural features with task-specific modifications, as shown in 800 of FIG. 8.

Figure 9:
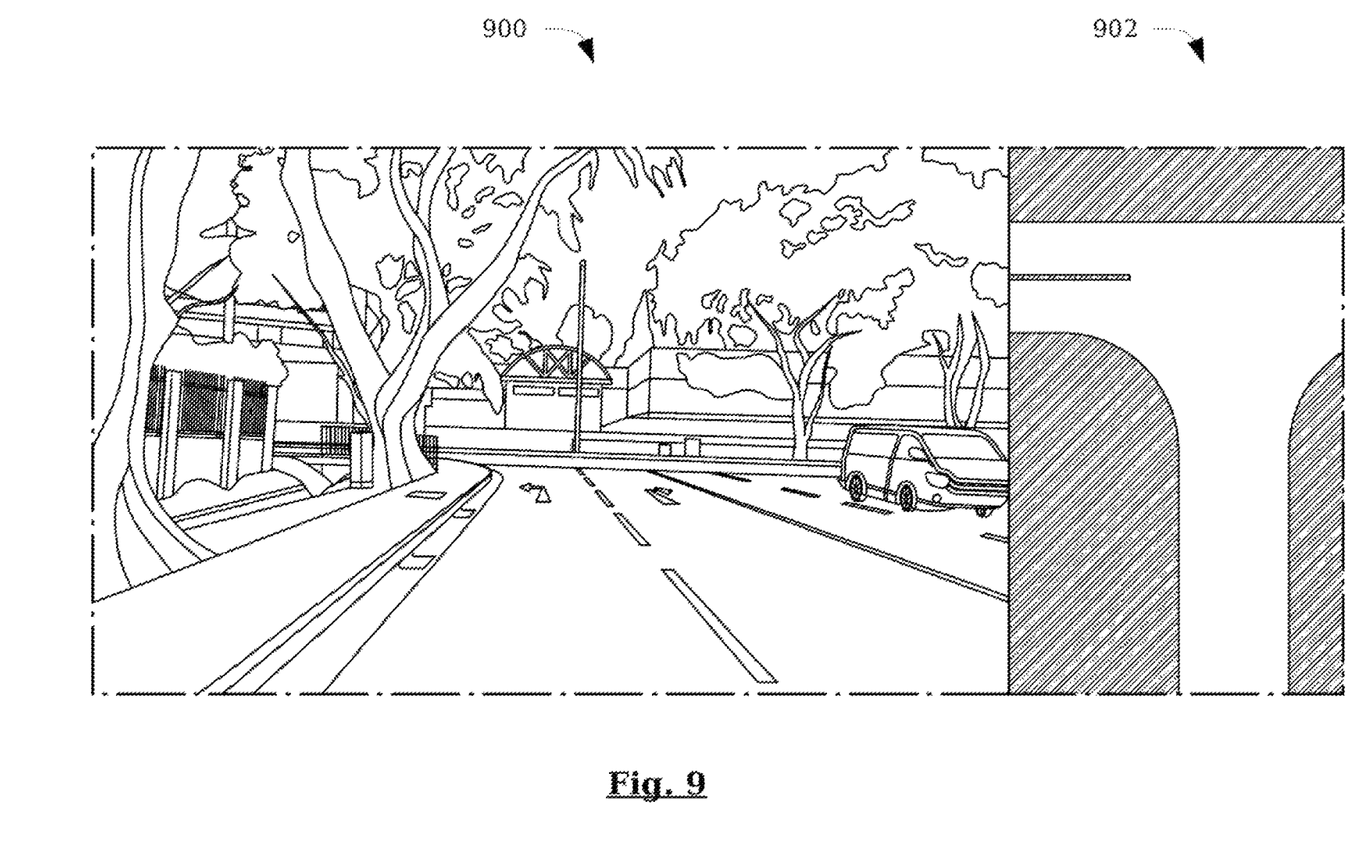
FIG. 9 illustrates example image of a camera and a corresponding standard definition top-view map.

FIG. 9 shows another example camera image 900, and a schematic top-view map 902 generated from a standard definition (SD) road map. A schematic top-view map 902 may alternatively be generated from an aerial or satellite image, and may be stored in a memory in the vehicle, and/or in a network-accessible server. The top-view map 902 may also be a purely topological map, wherein roads and their connections are presented as edges and vertices of a graph with known coordinates. Alternatively, satellite, aerial, or map images, such as standard definition (SD) maps, may be used directly, wherein the SD maps consist of roads and intersections. In an exemplary embodiment, both images may be used as an input for processing, such that the predicted navigation key points are superimposed onto the standard definition (SD) map, thereby increasing the reliability and accuracy of the determination of a navigation key point. As an optional pre-processing step, either the camera image 900 or the schematic top-view image 902 may be perspectively transformed so that image coordinates (pixel row and column) of both input images relate to the same geocentric coordinates. This is particularly helpful when the quality of the camera image is low due to bad weather (e. g. fog) or other circumstances (e. g. impurities on the camera).

Figure 10:
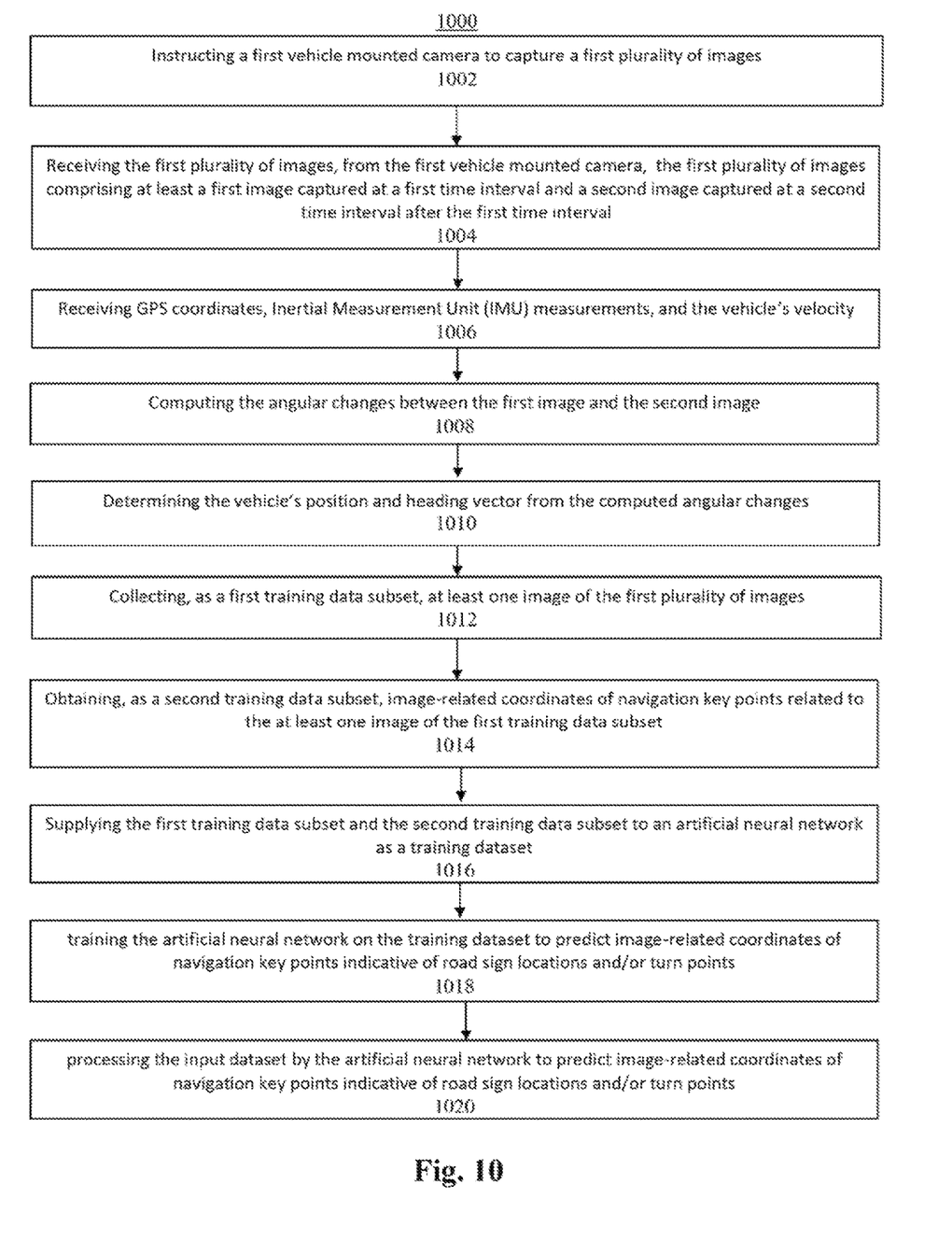
FIG. 10 illustrates a flow diagram of an embodiment of a method for determining a vehicle's position.

FIG. 10 shows a flow diagram 1000 of an embodiment of the method of the disclosure. In step 1002, a first vehicle mounted camera is instructed to capture a first plurality of images. The first vehicle mounted camera may be a FFC 202 as discussed above, and may be instructed by a VO unit 204 as described above. Step 1004 calls for the first plurality of images to be received, wherein the first plurality of images comprise at least a first image captured at a first time interval and a second image captured at a second time interval after the first time interval. At step 1006, the method calls for receiving GPS coordinates, Inertial Measurement Unit (IMU) measurements, and the vehicle's velocity. The GPS coordinates are received from the GNSS module 208 as described above, whereas the IMU measurements are received from the IMU module 206 as described above. All measurements are received at the Fusion Engine 210 as describe above. At step 1008, the VO unit 204 computes the angular changes between the first image and the second image, and at step 1010 the VO unit 204 determines the vehicle's position and heading vector from the computed angular changes. This allows for the navigation system of a vehicle to determine the vehicle's position and heading vector in real-time, which allows the system to reliably use Augmented Reality to predict turn points and lane changes as discussed above. Step 1012 at least one of the first plurality of images is collected, as a first training subset, by the Fusion Engine 210. At step 1014 a second training data subset is obtained from image-related coordinates of navigation key points related to the at least one image of the first training data subset. The method continues with step 1016, wherein the first training data subset and the second training data subset are supplied to an artificial neural network (such as the deep neural network of FIG. 3) as a training dataset. Therefore, the Fusion Engine 210 can train the artificial neural network on the training dataset to predict image-related coordinates of navigation key points indicative of road sign locations and/or turn points as set out in step 1018. Finally, in step 1020, the input dataset is processed by the artificial neural network to predict image-related coordinates of navigation key points indicative of road sign locations and/or turn points.

The invention claimed is:

1. A computer-implemented method for determining a vehicle's position and predicting navigation key points comprising:
   instructing a first vehicle mounted camera to capture a first plurality of images;
   receiving the first plurality of images from the first vehicle mounted camera, the first plurality of images comprising at least a first image captured at a first time interval and a second image captured at a second time interval after the first time interval;
   receiving GPS coordinates, Inertial Measurement Unit (IMU) measurements, and a vehicle's velocity;
   computing one or more angular changes between the first image and the second image;
   determining the vehicle's position and heading vector from the one or more computed angular changes between the first image and the second image using Visual Odometry (VO);
   collecting, as a first training data subset, at least one image of the first plurality of images;
   obtaining, as a second training data subset, image-related coordinates of navigation key points related to the at least one image of the first training data subset;
   supplying the first training data subset and the second training data subset to an artificial neural network as a training dataset;
   training the artificial neural network on the training dataset to predict image-related coordinates of navigation key points indicative of road sign locations, turn points, or both;
      processing an input dataset by the artificial neural network to predict image-related coordinates of navigation key points indicative of road sign locations, turn points, or both, and
   using the VO to determine the vehicle's position and heading vector in real time, wherein the VO is carried out via a VO unit, and wherein the VO unit is configured to carry out a process, the process comprising:
      receiving a further plurality of images taken at an increased frequency compared to the first plurality of images responsive to a confidence value for the vehicle's position and heading being less than a pre-determined threshold for the first plurality of images;
      determining an updated confidence value for the vehicle's position and heading based on the further plurality of images taken at the increased frequency; and
      repeating the process if the updated confidence value is still determined to be below the pre-determined threshold.

2. The computer-implemented method of claim 1, further comprising:
   determining a confidence value for the determined vehicle's position and heading vector, based on the received GPS coordinates, IMU measurements, and vehicle's velocity.

3. The computer-implemented method of claim 2, further comprising:
   instructing the first vehicle mounted camera to capture a second plurality of images if the confidence value for the determined vehicle's position and heading vector is below a pre-determined threshold; and
   receiving the second plurality of images, from the first vehicle mounted camera.

4. The computer-implemented method of claim 3, wherein:
   the second plurality of images comprises at least a third image captured at a third time interval and a fourth image captured at a fourth time interval after the third time interval; and
   a time difference between the third time interval and the fourth time interval is shorter than a time difference between the first time interval and the second time interval.

5. The computer-implemented method of claim 4, further comprising:
   computing one or more angular changes between the third image and the fourth image; and
   determining the vehicle's position and heading vector from the one or more computed angular changes between the third image and the fourth image.

6. The computer-implemented method of claim 1, further comprising:
   instructing a second vehicle mounted camera to capture a third plurality of images; and
   receiving, from the second vehicle mounted camera, the third plurality of images.

7. The computer-implemented method of claim 1, further comprising:
   translating the image-related coordinates into geocentric coordinates.

8. The computer-implemented method of claim 7, further comprising:
   storing the geocentric coordinates in a memory device comprised in a mobile device, in a network-accessible server, or in both.

9. The computer-implemented method of claim 1, further comprising:
   determining a confidence value for the image-related coordinates.

10. The computer-implemented method of claim 9, wherein the first training data subset comprises one or more images for which the artificial neural network determines the confidence value for the image-related coordinates is below a pre-determined threshold.

11. The computer-implemented method of claim 1, wherein the artificial neural network is a convolutional neural network.

12. The computer-implemented method of claim 1, wherein the image-related coordinates of the second training data subset are obtained through at least one of user input, one or more crowdsourcing platforms, and providing established geocentric positions of the navigation key points in a pre-determined region.

13. The computer-implemented method of claim 1, further comprising:
supplying the first training data subset to a second artificial neural network as input data;
predicting, by the second artificial neural network, image-related coordinates of navigation key points based on the first training data subset;
determining a second confidence value indicative of one or more distances between the image-related coordinates of navigation key points predicted by the artificial neural network and the image-related coordinates of navigation key points predicted by the second artificial neural network, and
adjusting parameters of the artificial neural network based on the second confidence value when the second confidence value indicates a difference between predictions of the artificial neural network and the second neural network exceeds a threshold value.

14. The computer-implemented method of claim 1, further comprising:
superimposing the navigation key points onto a standard definition (SD) map, the SD map consisting of roads and intersections.

15. The computer-implemented method of claim 1, wherein
the VO uses a mono-vision algorithm.

16. An apparatus for determining a vehicle's position and predicting navigation key points, the apparatus comprising:
a first vehicle mounted camera;
a logic coupled to the first vehicle mounted camera;
a Global Navigation Satellite System (GNSS) module coupled to the logic, the GNSS module being operable to receive GPS coordinates;
an Inertial Measurement Unit (IMU) coupled to the logic, the IMU being operable to receive IMU measurements; and
a Visual Odometry (VO) unit coupled to the logic,
wherein the logic is operable to:
receive the vehicle's velocity;
instruct the first vehicle mounted camera to capture a first plurality of images;
receive the first plurality of images, from the first vehicle mounted camera, the first plurality of images comprising at least a first image captured at a first time interval and a second image captured at a second time interval after the first time interval;
compute one or more angular changes between the first image and the second image;
determine the vehicle's position and heading vector from the one or more computed angular changes between the first image and the second image using Visual Odometry (VO);
collect, as a first training data subset, at least one image of the first plurality of images;
obtain, as a second training data subset, image-related coordinates of navigation key points related to the at least one image of the first training data subset;
supply the first training data subset and the second training data subset to an artificial neural network as a training dataset;
determine a confidence value for the determined vehicle's position and heading vector, based on the received GPS coordinates, IMU measurements, and the vehicle's velocity;
train the artificial neural network on the training dataset to predict image-related coordinates of navigation key points indicative of road sign locations, turn points, or both; and
process an input dataset by the artificial neural network to predict image-related coordinates of navigation key points indicative of road sign locations, turn points, or both, and
wherein the VO unit is configured to:
receive a second plurality of images taken at an increased frequency compared to the first plurality of images responsive to the confidence value for the vehicle's position and heading being less than a pre-determined threshold for the first plurality of images;
determine an updated confidence value for the vehicles position and heading based on the second plurality of images taken at the increased frequency; and
repeat receiving further plurality of images' and determining further updated confidence values if the updated confidence value is still determined to be below the pre-determined threshold.

17. The apparatus of claim 16, further comprising a second vehicle mounted camera coupled to the logic, the second vehicle mounted camera operable to capture a second plurality of images.

18. A computer-implemented method for determining a vehicle's position and predicting navigation key points comprising:
instructing a first vehicle mounted camera to capture a first plurality of images;
receiving the first plurality of images from the first vehicle mounted camera, the first plurality of images comprising at least a first image captured at a first time interval and a second image captured at a second time interval after the first time interval;
receiving GPS coordinates, Inertial Measurement Unit (IMU) measurements, and a vehicle's velocity;
computing one or more angular changes between the first image and the second image;
determining the vehicle's position and heading vector from the one or more computed angular changes between the first image and the second image using Visual Odometry (VO);
determining a confidence value for the determined vehicle's position and heading vector, based on the received GPS coordinates, IMU measurements, and vehicle's velocity;
collecting, as a first training data subset, at least one image of the first plurality of images;
obtaining, as a second training data subset, image-related coordinates of navigation key points related to the at least one image of the first training data subset;
supplying the first training data subset and the second training data subset to an artificial neural network as a training dataset;
training the artificial neural network on the training dataset to predict image-related coordinates of navigation key points indicative of road sign locations, turn points, or both; and processing an input dataset by the artificial neural network to predict image-related coordinates of navigation key points indicative of road sign locations, turn points, or both; and using the VO to determine the vehicle's position and heading vector in real time, wherein the VO is carried out via a VO unit, and wherein the VO unit is configured to carry out a process, the process comprising:

receiving a further plurality of images taken at an increased frequency compared to the first plurality of images responsive to a confidence value for the vehicle's position and heading being less than a pre-determined threshold for the first plurality of images;

determining an updated confidence value for the vehicle's position and heading based on the further plurality of images taken at the increased frequency; and repeating the process if the updated confidence value is still determined to be below the pre-determined threshold.

* * * * *